United States Patent
Nicolai

(10) Patent No.: US 7,449,846 B2
(45) Date of Patent: Nov. 11, 2008

(54) BALLAST FOR A GAS DISCHARGE LAMP AND A METHOD OF CONTROLLING THIS BALLAST

(75) Inventor: Jean-Marc Nicolai, Courbevoie (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/614,563

(22) Filed: Dec. 21, 2006

(65) Prior Publication Data

US 2007/0152602 A1   Jul. 5, 2007

(30) Foreign Application Priority Data

Jan. 5, 2006   (FR) .................................. 06 00095

(51) Int. Cl.
*G06F 1/00* (2006.01)

(52) U.S. Cl. ..................... 315/309; 315/247; 315/224; 315/209 R; 315/291

(58) Field of Classification Search ........... 315/209 CD, 315/224, 225, 247, 246, 291, 307, 209 R, 315/309

See application file for complete search history.

(56) References Cited

U.S. PATENT DOCUMENTS

| 6,294,879 B1 * | 9/2001 | Nagase et al. ........... 315/209 R |
| 6,366,030 B1 | 4/2002 | Ito et al. | |

FOREIGN PATENT DOCUMENTS

| EP | 0684754 | 11/1995 |
| EP | 0684755 | 11/1995 |
| FR | 2791218 A1 | 9/2000 |

* cited by examiner

*Primary Examiner*—Tuyet Vo
(74) *Attorney, Agent, or Firm*—Jacox, Meckstroth & Jenkins

(57) ABSTRACT

A ballast that comprises a DC-DC converter, a DC-AC converter, a lighting voltage generator and a control unit. A difference in voltage between input terminals of the lighting voltage generator is generated by a voltage step-up circuit of the "self-boosting" type from a DC voltage supplied by the DC-DC converter and an auxiliary voltage source V0. The ballast makes it possible to obtain a voltage level V2 that is equal to twice a first voltage level V1 increased by the auxiliary voltage V0.

24 Claims, 3 Drawing Sheets

BALLAST FOR A GAS DISCHARGE LAMP AND A METHOD OF CONTROLLING THIS BALLAST

TECHNICAL FIELD OF THE INVENTION

The present invention concerns a ballast for a gas discharge lamp, in particular a xenon lamp, and a method of controlling this ballast, in particular during the initiation of the phase of switching on the lamp.

TECHNOLOGICAL BACKGROUND OF THE INVENTION

For the purpose of improving both the light power and the energy efficiency of light sources used in many fields, such as vehicle headlights or video projectors, current technical changes are leading to replacing filament lamps with high-intensity gas discharge lamps. Unlike conventional bulbs, which were designed to be connected directly to a low-voltage source, such as the battery of a vehicle, or a medium voltage, such as the domestic mains at 110 or 220 V, these new lamps require high voltages, AC or DC, according to the operating mode, in order to create and maintain the electrical discharge in the gas.

In the automotive field, these high voltages, specific to each type of lamp (around 25 kV for lighting a xenon lamp), are produced from the onboard voltage by a supply module, which also provides the regulation, known by the name "ballast".

The most recent ballasts usually comprise a DC to DC converter with chopping producing a continuous high voltage of several hundreds of volts from the 12 V of the battery, a DC to AC converter supplying the lamp in DC regime from the DC high voltage, and a voltage step-up circuit supplying a generator producing the very high voltage necessary for igniting the lamp.

A ballast of this type is described in detail in French patent application FR2791218.

The DC to DC converter used comprises a voltage step-up transformer whose primary winding is connected in a series with a switching device at the terminals of the DC voltage source. The repeated interruption of the latter by the switching device induces, at the terminals of the secondary winding of the transformer, a high voltage rectified by a diode and filtered by a capacitor.

The DC to AC converter of the ballast comprises four switching transistors connected as an inverter bridge, the simultaneous opening or closing of one pair of opposite transistors being controlled in alternation with that of another pair in order to produce an alternating high voltage from the DC high voltage.

A control unit controls the device and the switching transistors.

The very high voltage generator of the ballast comprises an ignition transformer, the secondary winding of which is connected in series with the discharge lamp at the output terminals of the DC to AC converter. The primary winding of the transformer is connected in series with a spark generator at the terminals of a capacitor charged by the step-up circuit.

The step-up circuit of this ballast consists of a supplementary secondary winding of the transformer of the DC to DC converter supplying a rectify/filtering cell.

The use of a transformer having two secondary windings in the DC to DC converter of a ballast is a simple and well known solution that makes it possible to effectively produce the high voltage necessary to the lamp ignition voltage generator.

However, the design and manufacture of such a transformer are relatively complex since the voltages and currents involved are high.

A known model of transformer of this kind comprises a primary of 4 turns and two secondaries of 20 turns and 34 turns in series. The voltages developed in operation at the terminals of the secondary are −400 V and 600 V respectively. The primary of the transformer being connected to the low-voltage source, the problems of insulation that must be resolved can easily be conceived.

In addition, the presence of the two windings and of their connection terminals necessarily results in a high form factor.

Finally, the high number of turns on the transformer gives rise to a high distributive capacitance that is opposed to a high operating frequency of the chopping converter and therefore to optimum efficiency.

Having regard to these drawbacks, the aim of the invention is to eliminate the supplementary secondary winding of the step-up transformer of the DC to DC converter, replacing it with a step-up circuit of another type.

GENERAL DESCRIPTION OF THE INVENTION

The present invention therefore concerns a gas discharge lamp ballast comprising:
- a DC to DC converter supplying a DC voltage at a first predetermined level V1 from a DC supply source,
- a DC to AC converter comprising first, second, third and fourth switching elements connected as an inverter bridge, supplied by this DC to DC converter between a first node common to the first and second elements and a second node common to the third and fourth elements, and supplying during a continuous operating phase of the discharge lamp an AC voltage between a third node common to the first and third elements and a fourth node common to the second and fourth elements.
- an ignition voltage generator comprising output terminals connected in series with the discharge lamp to the third and fourth nodes of the inverter bridge, and input terminals subjected, during the initiation of the ignition phase of the discharge lamp, to a voltage difference of a second predetermined level V2.
- a control unit supplying first control signals to the DC to DC converter and second control signals to the DC to AC converter according to a control input (P) dependent on the operating phases of the discharge lamp.

The object of the invention is precisely a ballast of this type, remarkable in that the voltage difference between the input terminals of the discharge lamp ignition voltage generator is generated by a voltage step-up circuit of the "self-boosting" type and from the DC voltage produced by the DC to DC converter of the ballast and an auxiliary voltage source of a predetermined value V0, wherein said voltage step up circuit creates a voltage on a capacitor which is higher than said predetermined value V0.

According to a characteristic specific to the ballast according to the invention, the second predetermined level V2 of the voltage difference generated by this self-boosting circuit is equal to twice the first predetermined level V1 of the DC voltage produced by the DC to DC converter increased by the predetermined value V0.

Highly advantageously, the voltage step-up circuit comprises a holding diode and a self-boosting capacitor in series. The common terminal between this holding diode and this self-boosting capacitor is electrically connected to a first input terminal of the ignition generator, and the other terminal of the self-boosting capacitor is connected to the fourth node of the DC to AC converter bridge. The cathode or anode of the holding diode is connected to the auxiliary voltage source respectively according to the positive or negative polarity of the DC voltage produced by the DC to DC converter.

Preferably, the ignition generator comprises an ignition capacitor between its input terminals, and a second input terminal is electrically connected to the second node of the DC to AC converter bridge.

This ignition generator also advantageously comprises a spark generator and a primary winding of an ignition transformer in series between its input terminals. A secondary winding of the ignition transformer is connected in parallel to the output terminals of the ignition generator.

The ballast according to the invention preferably uses switching elements consisting of transistors of the IGBT type, the gates of which are connected to the control unit.

According to a particular embodiment of the ballast, the auxiliary voltage V0 is zero, the anode or cathode of the holding diode of the self-boosting circuit being connected to earth.

In another embodiment of the invention, the DC to DC converter comprises a step-up transformer with a single secondary winding, the primary winding of which is connected in series with a switching device on the DC supply source. In this case, the auxiliary voltage is advantageously equal to the potential of the common point between this primary winding and the switching device, the anode or cathode of the holding diode of the self-boosting circuit being connected to this common point.

The present invention also concerns a method of controlling a ballast having the above characteristics. This method is remarkable in that:

during the initiation of the discharge lamp ignition phase, the second control signals emanating from the control unit simultaneously cause the opening of the first and second switching elements and the closing of the said third and fourth switching elements so as to charge the self-boosting capacitor in advance to a potential difference Vb by adding the DC voltage of the first predetermined level V1 and the auxiliary voltage of the predetermined value V0 and then the second control signals simultaneously cause the opening of the first and fourth switching elements and the closing of the second and third switching elements so as to apply to the input terminals of the ignition voltage generator the sum of this potential difference Vb and of the DC voltage of the first predetermined level V1;

during the continuous operating phase of the discharge lamp, the second control signals cause alternately the simultaneous opening or closing of the first and fourth switching elements and respectively the simultaneous closing or opening of the second and third switching elements, so as to generate between the third and fourth nodes the AC voltage intended to supply the lamp.

In the embodiment of the invention where the breakdown of a voltage appearing at the live point of the primary of the transformer of the DC to DC converter, the first control signals cause alternately the opening and closing of the switching device so as to generate the auxiliary voltage of the predetermined value V0.

These few essential specifications will have made obvious to a person skilled in the art the advantages afforded by the ballast according to the invention compared with the prior art.

In addition, the invention, because of the availability of control signals representing operating phases of the discharge lamp, also has the corresponding advantage of allowing an increased power control during the starting of the lamp. For example, by forcing the control signals supplied to the DC to DC converter to one or more predetermined duty cycles during the starting phase. It thus becomes possible to reduce the capacitance of large capacitors normally used for supplying the current necessary at the time of starting of the lamp.

The detailed specifications of the invention are given in the following description in relation to the accompanying drawings. It should be noted that these drawings have the sole purpose of illustrating the text of the description and in no way constitute a limitation to the scope of the invention.

DESCRIPTION OF PREFERRED
EMBODIMENTS OF THE INVENTION

Figure 1:
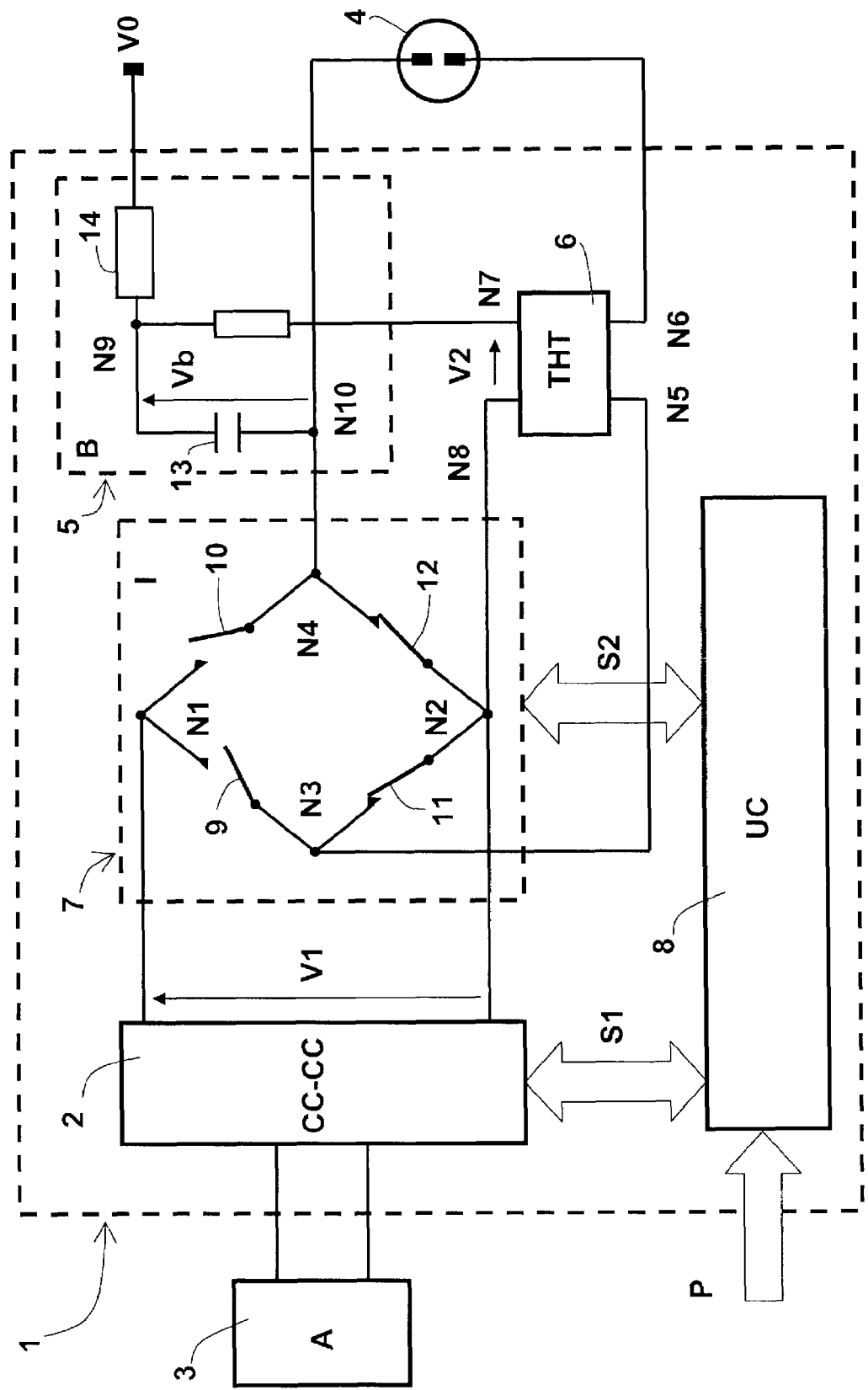
FIG. 1 is a general block diagram of the gas discharge lamp ballast according to the invention illustrating the principle of the charging of the capacitor of the self-boosting circuit by the DC to DC converter.
Figure 2:
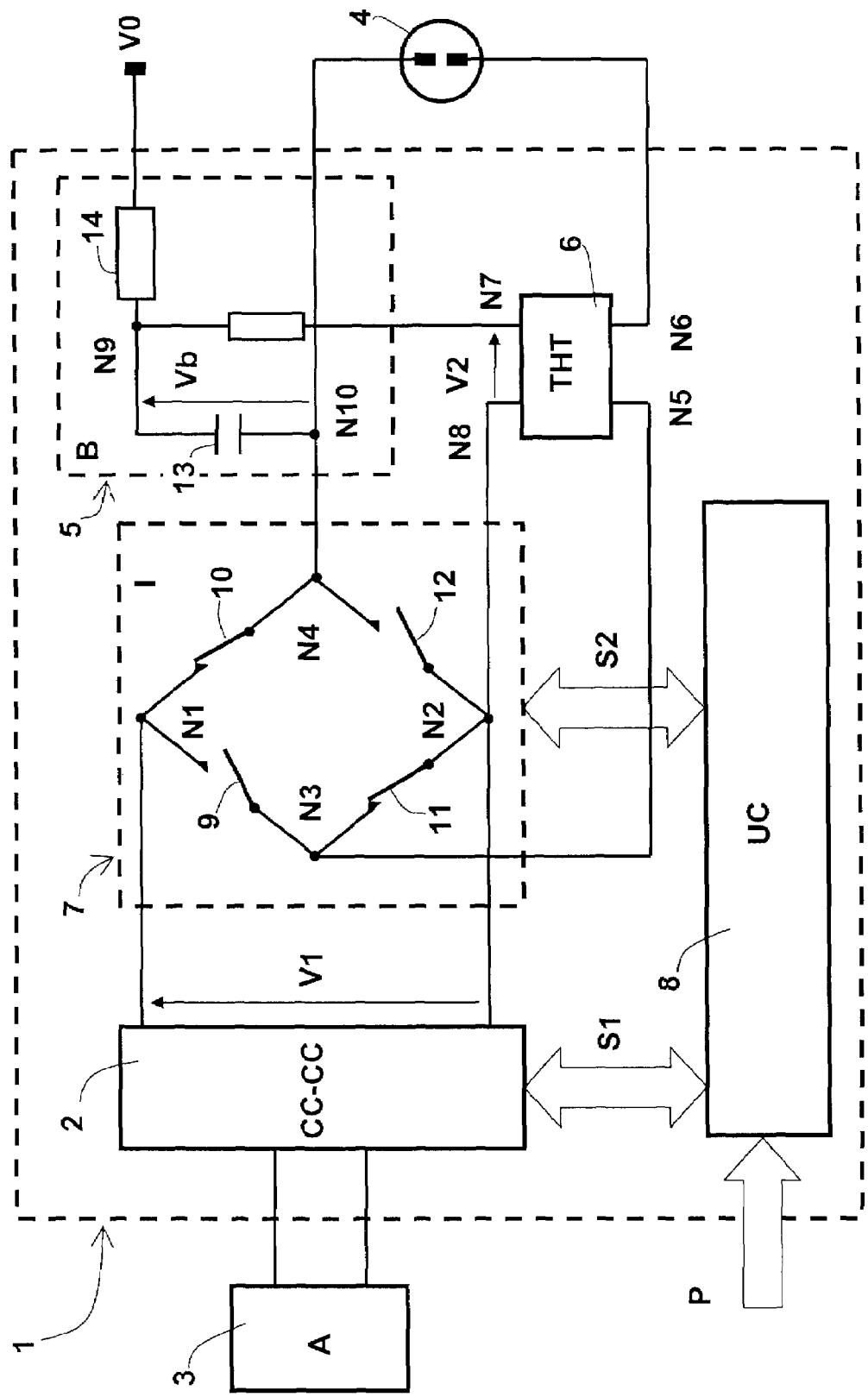
FIG. 2 is a general block diagram of the gas discharge lamp ballast according to the invention illustrating the principle of the generation of the voltage difference applied to the primary of the ignition transformer.

The functional architecture of the ballast according to the invention is depicted in FIGS. 1 and 2.

The ballast 1 comprises essentially a DC to DC converter 2 with chopping supplied by a 12 V DC supply source 3 and supplying a DC high voltage V1 of around 450 V, from which there are produced the various voltages necessary for the discharge lamp 4 to start and operate in continuous regime.

The discharge lamp 4 is a high-intensity xenon gas discharge lamp that requires in particular an ignition voltage of around 25 kV. This very high voltage is produced from the DC high voltage V1 by a voltage step-up circuit 5 supplying, at a voltage difference V2 of around 1000 V, a dedicated ignition voltage generator 6 when the ignition phase is initiated.

The AC high voltage necessary for the functioning of the discharge lamp 4 in continuous regime is produced in a manner known per se by means of a DC to AC converter, consisting of an inverter bridge 7, from the DC high voltage V1 supplied by the DC to DC converter 2.

In continuous regime, the width of the chopping pulses of the DC to DC converter 2, and the functioning of the inverter bridge 7, are controlled, in a manner also known per se, according to the power consumed by the discharge lamp 4 by a microcontroller unit 8 by means of control signals S1, S2 in response to external control instructions P.

The switching elements 9, 10, 11, 12 of the inverter bridge 7, present in any ballast 1 of this type for transforming the DC high voltage V1 of the DC to DC converter 2 into alternating voltage during the continuous regime of the discharge lamp 4, are advantageously used in the ballast 1 according to the invention for charging, when the ignition phase is initiated, a self-boosting capacitor 13 with a high voltage source Vb, and then discharging it into the input circuit of the ignition voltage generator 6, according to the principle of circuits of the "self-boosting" type, better known by the English term "bootstrap".

In the conventional circuitry of the inverter bridge 7, two opposite nodes N1, N2 are connected to the output of the DC to DC converter 2, and the other two opposite nodes N3, N4 are connected in series with the discharge lamp 4 and the output terminals N5, N6 of the ignition voltage generator 6.

This ignition voltage generator 6 is a voltage threshold device: when the voltage difference V2 between the input terminals N7, N8 is greater than a predetermined threshold, a very high voltage pulse is generated between the output terminals N5, N6.

In continuous regime, two opposite switching elements 9, 12 are simultaneously open or closed whilst the other two opposite switching elements 10, 11 are conversely simultaneously closed or open at the working frequency of the DC to AC converter.

FIG. 1 shows that, on the other hand, when the self-boosting capacitor 13 of the voltage step-up circuit 5 is charged, two adjacent switching elements 11, 12 of the inverter bridge 7 are closed whilst the other two switching elements 9, 10 are open.

Because of this, a terminal N9 of the self-boosting capacitor 13 being connected to an auxiliary voltage source with a predetermined value V0 of around 100 V by means of a diode 14, and the other terminal being connected to the output terminal of given polarity of the DC to DC converter, the self-boosting capacitor 13 is charged to the value Vb=V1+V0 of around 550 V.

One of the input terminals N7 of the ignition voltage generator 6 is connected to the common terminal between the self-boosting capacitor 13 and the diode 14 and, the other terminal N8 being connected to the output terminal of given polarity of the DC to DC converter, the input of this ignition voltage generator 6 is subjected to the voltage difference Vb=V1+V0.

It goes without saying that the ignition voltage generator 6 is designed to trigger not under these conditions but for a higher voltage difference V2 of around 800 V.

FIG. 2 shows the configuration of the switching elements 9, 10, 11, 12 of the inverter bridge 7 making it possible to generate a voltage difference V2 higher than the predetermined threshold between the input terminals N7, N8 of the ignition voltage generator 6.

Two opposite switching elements 9, 10 of the inverter bridge 7 are closed (the other two of course being open) and connect the self-boosting capacitor 13 in series with the DC to DC converter 2 at the input terminals N7, N8 of the ignition voltage generator 6.

The diode 14 in series with the self-boosting capacitor 13 is arranged so as to block the discharge of this self-boosting capacitor 13 into the auxiliary voltage source V0.

Because of this, the voltage difference V2 between the input terminals N7, N8 is equal to the sum of the voltage Vb at the terminals of the self-boosting capacitor 13 and the DC voltage V1 of the DC to DC converter 2.

Given that the voltage Vb at the terminals N7, N8 of the self-boosting capacitor 13 is equal to the sum of the output voltage V1 of the DC to DC converter 2 and the auxiliary voltage V0, this voltage difference V2 is consequently equal to twice the voltage of the DC to DC converter 2 increased by the auxiliary voltage V0. It is therefore around 1000 V, higher than the triggering threshold of 600 V of the ignition voltage generator 6.

Figure 3:
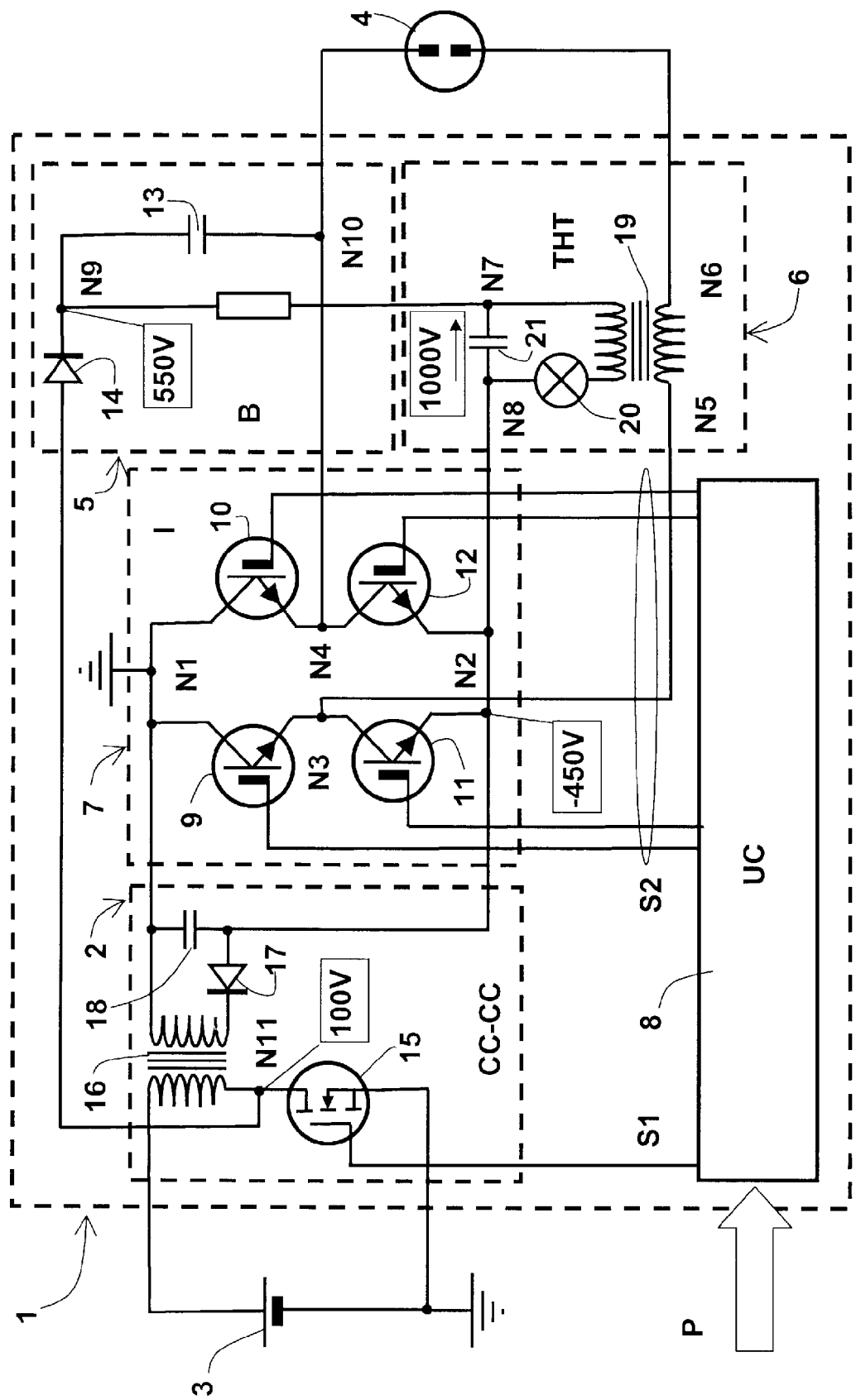
FIG. 3 is an electrical diagram of a preferred embodiment of the ballast according to the invention.

FIG. 3 shows in particular the way in which the auxiliary voltage source of a predetermined value V0 is produced.

In a manner known per se, the electrical diagram of the DC to DC converter 2 uses an n-type MOSFET power transistor 15 switching the primary current of a step-up transformer 16 connected in series to a battery whose negative pole is earthed.

In continuous regime, the gate of this self-boosting capacitor 13 is controlled by the chopping pulses S1 transmitted by the microcontroller unit 8 so as to supply at the output of the DC to DC converter 2 a negative voltage of around −450V after rectification and filtering by a diode cell 17/capacitor 18 of the voltage appearing at the terminals of the secondary of the step-up transformer 16, one of which is connected to earth.

During the initiation of the phase of ignition of the discharge lamp 4, the chopping pulses S1 are also slaved so as to supply at the drain N11 of the n-type MOSFET power transistor 15 a positive voltage of predetermined value V0 of around 100 V supplying the "bootstrap" voltage step-up circuit 5.

FIG. 3 also shows the detailed electrical diagram, known per se, of the ignition voltage generator 6.

This ignition voltage generator 6 comprises an ignition transformer 19 whose secondary N5, N6 is inserted in series with the discharge lamp 4 at the output terminals N3, N4 of the inverter bridge 7.

The threshold effect of the ignition voltage generator 6 is due to the presence of a gas spark generator 20 connected in series with the primary of the ignition transformer 19 to the terminals of the ignition capacitor 21, this ignition capacitor 21 being connected in parallel to the input terminals N7, N8 of the ignition voltage generator 6. When the voltage difference at the terminals N7, N8 of the ignition capacitor 21 is greater than the predetermined threshold, the gas spark generator 20 becomes abruptly conductive and creates a current pulse in the primary of the ignition transformer 19, which produces at the secondary the EHT necessary for starting the discharge lamp 4.

Preferably, as also shown in FIG. 3, the inverter bridge 7 consists of four switching elements 9, 10, 11, 12 of the "IGBT" type (the English acronym for "Insulated Gate Bipolar Transistor", translated into French by "Transistor bipolaire à grille isolée"), well adapted to the switched currents and high voltages involved, both during the ignition phase and during the continuous operation phase of the discharge lamp 4.

The inverter bridge 7 is inserted between the earth N1 and the negative polarity output N2 of the DC to DC converter 2, so that the self-boosting capacitor is charged with a negative voltage. As a result the anode of the holding diode 14 is connected to the drain N11 of the n-type MOSFET power transistor 15 of the DC to DC converter 2.

In a variant, the anode of the holding diode 14 is connected to earth, which simplifies the control of the ballast, but causes around 100 volts to be lost at the terminals N7, N8 of the ignition voltage generator 6.

The omission of the 600 V supplementary secondary winding of the step-up transformer 16 of the DC to DC converter 2 makes it possible to reduce its volume and to decrease the number of connection lugs on the component.

The reduction in the number of turns on the step-up transformer 16 makes it possible to reduce the distributed capacitance, and therefore to increase the operating frequency of the DC to DC converter 2, and consequently its efficiency.

The technical advantages procured by the ballast according to the invention are particularly important when the ballast is used for supplying a vehicle headlight lamp and since, translated in terms of reduction in manufacturing costs, they confer a certain competitive advantage.

As goes without saying, the invention is not limited solely to the preferential embodiments described above. On the contrary it embraces all possible variant embodiments.

In particular the special earthing points and the polarities of the voltages indicated in FIG. 3 are in no way limiting.

For example, the DC to DC converter 2 could just as well supply a positive DC high voltage with respect to earth, rather than negative. In this case the connection of the switching elements 9, 10, 11, 12 of the inverter bridge 7 is modified accordingly, or the switching elements 9, 10, 11, 12 are replaced by pnp types.

The particular embodiments of the DC to DC converter 2, of the inverter bridge 7, of the ignition voltage generator 6 and of the voltage step-up circuit 5 depicted are also not limiting; any other set of devices producing the same set of voltages necessary for the ignition and functioning of a discharge lamp will not depart from the scope of the present invention provided that these devices are integrated in a ballast 1 resulting from the following claims.

What is claimed is:

1. A ballast lamp with gas discharge of the type comprising:
   a DC to DC converter supplying a DC voltage at a first predetermined level $V1$ from a DC supply source;
   a DC to AC converter comprising first, second, third and fourth switching elements connected as an inverter bridge, supplied by said DC to DC converter between a first node common to said first and second switching elements and a second node common to said third and fourth switching elements, and supplying during a continuous operating phase of a discharge lamp an AC voltage between a third node common to said first and third switching elements and a fourth node common to said second and fourth switching elements;
   an ignition voltage generator comprising output terminals connected in series with a lamp to said third and fourth nodes of said bridge, and input terminals subjected, during the initiation of the ignition phase of said discharge lamp, to a voltage difference of a second predetermined level $V2$; and
   a control unit supplying first control signals to said DC to DC converter and second control signals to said DC to AC converter according to a control input dependent on said phases;
   wherein said voltage difference between said input terminals of said ignition voltage generator is generated by a voltage step up circuit of the "self-boosting" type from said DC voltage of said DC to DC converter and an auxiliary voltage source of a predetermined value $V0$, wherein said voltage step up circuit creates a voltage on a capacitor which is higher than said predetermined value $V0$.

2. A motor vehicle, comprising at least one ballast according to claim 1.

3. The ballast lamp for a gas discharge lamp according to claim 1, in which said voltage difference is measured between said third node and a terminal of a series resistor through which capacitor discharges.

4. The ballast lamp for a gas discharge lamp according to claim 1, in which said voltage difference is measured between a fixed reference voltage and an applied voltage.

5. The ballast lamp for a gas discharge lamp according to claim 1, in which said voltage difference persists for a time duration determined by duration of auxiliary voltage $V0$.

6. The ballast lamp for a gas discharge lamp according to claim 1, wherein said voltage step up circuit comprises a capacitor which discharges through a resistor connected to one of said out terminals of the ignition voltage generator.

7. A ballast lamp with gas discharge of the type comprising:
   a DC to DC converter supplying a DC voltage at a first predetermined level $V1$ from a DC supply source;
   a DC to AC converter comprising first, second, third and fourth switching elements connected as an inverter bridge, supplied by said DC to DC converter between a first node common to said first and second switching elements and a second node common to said third and fourth switching elements, and supplying during a continuous operating phase of a discharge lamp an AC voltage between a third node common to said first and third switching elements and a fourth node common to said second and fourth switching elements;
   an ignition voltage generator comprising output terminals connected in series with a lamp to said third and fourth nodes of said bridge, and input terminals subjected, during the initiation of the ignition phase of said discharge lamp, to a voltage difference of a second predetermined level $V2$; and
   a control unit supplying first control signals to said DC to DC converter and second control signals to said DC to AC converter according to a control input dependent on said phases;
   wherein said voltage difference between said input terminals of said ignition voltage generator is generated by a voltage step up circuit of the "self-boosting" type from said DC voltage of said DC to DC converter and an auxiliary voltage source of a predetermined value $V0$;
   wherein said second predetermined level $V2$ is equal to twice said first predetermined level $V1$ increased by said predetermined value $V0$.

8. The ballast lamp with gas discharge according to claim 7, wherein said switching elements are transistors of the IGBT type whose gates are connected to said control unit.

9. The ballast lamp with gas discharge according to claim 7, wherein said voltage step up circuit comprises a holding diode and a self-boosting capacitor in series, a common terminal between said holding diode and said self-boosting capacitor being electrically connected to a first of said input terminals of said ignition voltage generator, the other terminal of said self-boosting capacitor being connected to said fourth node of said bridge, and the cathode or anode of said holding diode being connected to said auxiliary voltage source respectively at the positive or negative polarity of said DC voltage.

10. The ballast lamp with gas discharge according to claim 9, wherein said auxiliary voltage is zero, said anode or said cathode being connected to earth.

11. The ballast lamp with gas discharge according to claim 9, wherein said DC to DC converter comprises a step-up transformer with a single secondary winding whose primary winding is connected in series with a switching device on said DC source, and in that said auxiliary voltage is equal to the potential of the common point between said primary winding and said switching device, said anode or said cathode being connected to said common point.

12. The ballast lamp with gas discharge according to claim 9, wherein said ignition voltage generator comprises an ignition capacitor between said input terminals the second of said input terminals of said ignition voltage generator being electrically connected to said second node of said bridge.

13. The ballast lamp with gas discharge according to claim 12, wherein said ignition voltage generator comprises an addition a spark generator and a primary winding of an ignition transformer in series between said input terminals, a secondary winding of said ignition transformer being connected in parallel to said output terminals of said ignition voltage generator.

14. A method of controlling a ballast for a gas discharge lamp according to claim 9, wherein:
   during the initiation of said ignition phase, said second control signals simultaneously cause the opening of said first and second switching elements and the closing of said third and fourth switching elements so as to charge said self-boosting capacitor in advance to a potential difference Vb by adding said DC voltage of said first predetermined level V1 and said auxiliary voltage of said predetermined value V0 and then said second control signals simultaneously cause the opening of said first and fourth switching elements and the closing of said second and third switching elements so as to apply to said input terminals of said ignition voltage generator the sum of said potential difference Vb and of said DC voltage of said first predetermined level V1;

during said continuous operating phase, said second control signals cause alternately the simultaneous opening or closing of said first and fourth switching elements and respectively the simultaneous closing or opening of said second and third switching elements, so as to generate between said third and fourth nodes said AC voltage.

15. The method of controlling a ballast for a gas discharge lamp according to claim 14, wherein, during said initiation phase, said first control signals cause alternately the opening and closing of said switching device so as to generate said auxiliary voltage of said predetermined value V0.

16. A ballast lamp with gas discharge of the type comprising:
- a DC to DC converter supplying a DC voltage at a first predetermined level V1 from a DC supply source;
- a DC to AC converter;
- an ignition voltage generator; and
- a control unit;
- wherein said DC to DC converter, said DC to AC converter, said ignition voltage generator and said control unit are operatively arranged so that a voltage difference between input terminals of said ignition voltage generator is generated by a voltage step up circuit of the "self-boosting" type from said DC voltage of said DC to DC converter and an auxiliary voltage source of a predetermined value V0, wherein said voltage step up circuit creates a voltage on a capacitor which is higher than said predetermined value V0.

17. A motor vehicle, comprising at least one ballast according to claim 16.

18. A ballast lamp with gas discharge of the type comprising:
- a DC to DC converter supplying a DC voltage at a first predetermined level V1 from a DC supply source;
- a DC to AC converter;
- an ignition voltage generator; and
- a control unit;
- wherein said DC to DC converter, said DC to AC converter, said ignition voltage generator and said control unit are operatively arranged so that a voltage difference between input terminals of said ignition voltage generator is generated by a voltage step up circuit of the "self-boosting" type from said DC voltage of said DC to DC converter and an auxiliary voltage source of a predetermined value V0;
- wherein said second predetermined level V2 is equal to twice said first predetermined level V1 increased by said predetermined value V0.

19. The ballast lamp with gas discharge according to claim 18, wherein said voltage step up circuit comprises a holding diode and a self-boosting capacitor in series, a common terminal between said holding diode and said self-boosting capacitor being electrically connected to a first of said input terminals of said ignition voltage generator, the other terminal of said self-boosting capacitor being connected to a fourth node of said bridge, and the cathode or anode of said holding diode being connected to said auxiliary voltage source respectively at the positive or negative polarity of said DC voltage.

20. The ballast lamp with gas discharge according to claim 19, wherein said switching elements are transistors of the IGBT type whose gates are connected to said control unit.

21. The ballast lamp with gas discharge according to claim 19, wherein said auxiliary voltage is zero, said anode or said cathode being connected to earth.

22. The ballast lamp for a gas discharge lamp according to claim 19, wherein said DC to DC converter comprises a step-up transformer with a single secondary winding whose primary winding is connected in series with a switching device on said DC source, and in that said auxiliary voltage is equal to the potential of the common point between said primary winding and said switching device, said anode or said cathode being connected to said common point.

23. The ballast lamp with gas discharge according to claim 19, wherein said ignition voltage generator comprises an ignition capacitor between said first of input terminals the second of said input terminals of said ignition voltage generator being electrically connected to said second node of said bridge.

24. The ballast lamp with gas discharge according to claim 23, wherein said ignition voltage generator comprises an addition a spark generator and a primary winding of an ignition transformer in series between said input terminals, a secondary winding of said ignition transformer being connected in parallel to said output terminals of said ignition voltage generator.

* * * * *